Sept. 26, 1950 W. A. STEWART 2,523,455
OBJECT LOCATING SYSTEM
Filed May 30, 1944 3 Sheets-Sheet 1
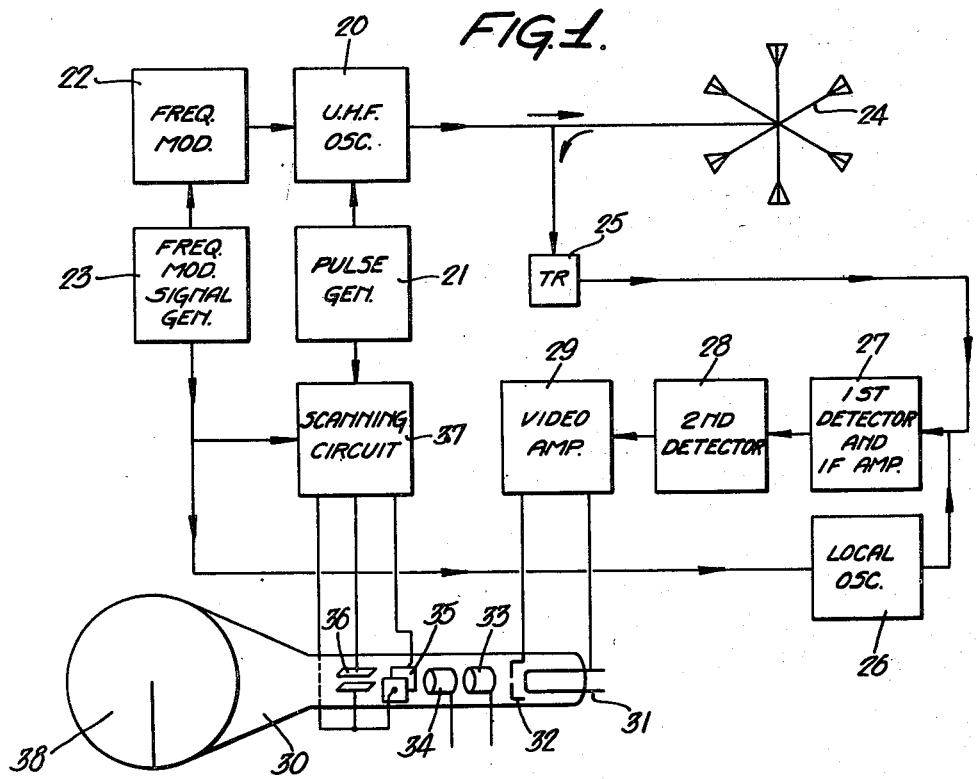
Inventor:
William A. Stewart
by his Attorneys
Howson + Howson

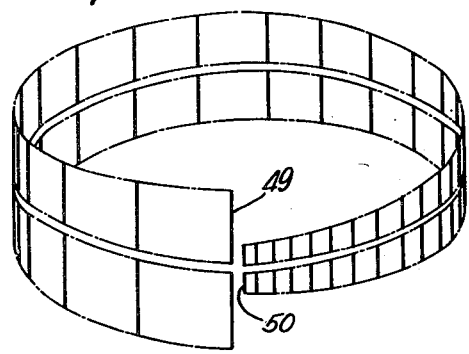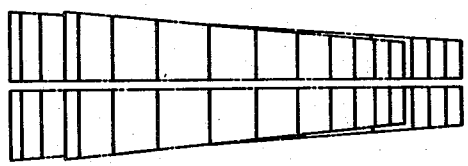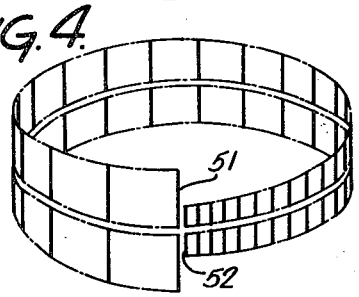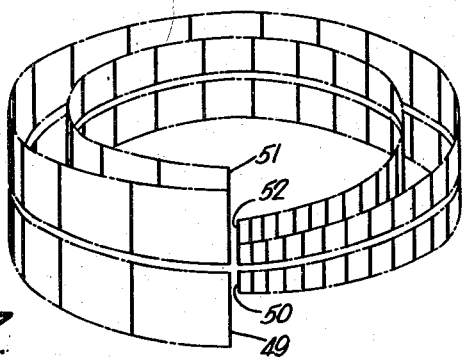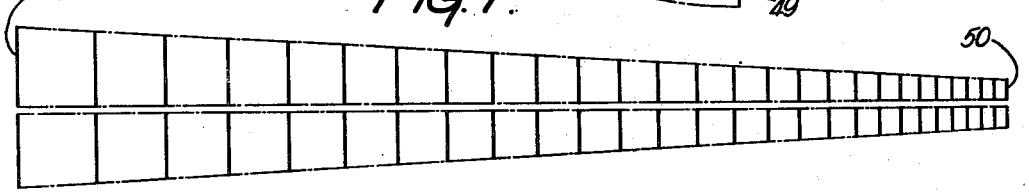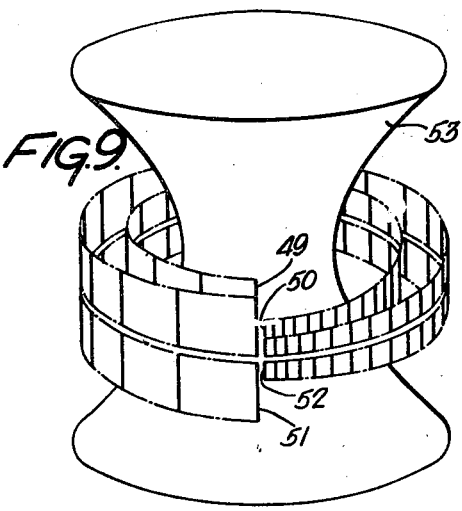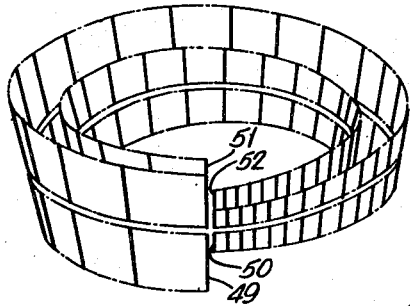

Sept. 26, 1950     W. A. STEWART     2,523,455
OBJECT LOCATING SYSTEM

Filed May 30, 1944     3 Sheets-Sheet 3

Inventor:—
William A. Stewart
by his Attorneys
Howson & Howson

Patented Sept. 26, 1950

2,523,455

UNITED STATES PATENT OFFICE 2,523,455

OBJECT LOCATING SYSTEM

William A. Stewart, Philadelphia, Pa., assignor, by mesne assignments, to Philco Corporation, Philadelphia, Pa., a corporation of Pennsylvania Application May 30, 1944, Serial No. 538,071

2 Claims. (Cl. 343—16)

The present invention relates to radio transmitting and receiving systems, and more particularly to a system for transmitting and receiving different ultra-high frequencies in different predetermined directions.

The ultra-high radio frequencies have been found to be particularly adapted for use in transmitting and receiving systems of a type used for a terrain clearance meter for determining the height, direction, and distance of an aircraft from a reference point on the earth. Such ultra-high frequency radio systems therefore have been provided with some arrangement for scanning the horizon, or in other words, directing the transmission of high frequency radiant energy in various different directions and receiving the reflected transmitted energy in order to obtain an indication as to the location of some object such as an aircraft above the earth. Various means have been used for bringing about the directive transmission of the energy in various driections, but more commonly such means have involved the use of mechanical apparatus to accomplish the desired result. Such mechanical apparatus requires certain synchronous ties with the receiver. This is necessary so that an indication, on a cathode ray tube or some other indicating device, caused by a reflection of the transmitted signal from some object or objects will correspond to the direction in which the energy was transmitted. Since such apparatus for synchronization not only is bulky and expensive but requires considerable service, it is desirable to produce corresponding results by a system using electrical means.

It is, therefore, an object of the present invention to provide an improved radio transmitting and receiving system for the directive transmission and reception of radiant energy.

It is also an object of the invention to provide an improved radio transmitting and receiving system for the directive transmission and reception of radiant energy in different directions in a single plane.

It is another object of the invention to provide an improved radio transmitting and receiving system for the directive transmission and reception of radiant energy in different directions coincident to the surface of an imaginary variable pitch cone.

It is another object of the invention to provide an improved radio transmitting and receiving system for transmitting and receiving different frequencies in different directions, providing continually changing directions of transmission and reception.

Still another object of the invention is to provide an improved apparatus for frequency-modulating ultra-high frequencies so as to obtain a plurality of frequencies which are to be transmitted in different directions.

Still another object of the invention is to provide an improved antenna array whereby different ultra-high frequencies will be transmitted in different directions.

An additional object is to provide an antenna array whereby continuously changing frequencies will be transmitted and received in directions identified with the frequencies, and to provide for pulse transmission and reception at continuously varying frequencies.

Other and further objects of the invention will be apparent from the following description taken in connection with the accompanying drawings, wherein Figure 1 is a schematic block diagram representing an ultra-high frequency radio transmitting and receiving system embodying the present invention;

Figure 2 is a schematic representation of one arrangement for obtaining the frequency modulation or frequency variation of the energy to be radiated;

Figure 3 is a perspective representation of an antenna array utilizing a plurality of dipole antennas;

Figure 4 is a similar perspective representation of a reflector array utilizing a plurality of dipoles for cooperation with the antenna array shown in Figure 3;

Figure 5 is a partial side view representation of the antenna array and reflector array shown in Figures 3 and 4 when in cooperative relation to each other;

Figure 6 is a perspective representation of the reflector and antenna arrays shown individually in Figures 3 and 4;

Figure 7 is a linear representation of the dipoles used in the arrays of Figures 3 to 6 which serves to illustrate the relation of the dipoles to each other;

Figure 8 shows in perspective an arbitrary position of an antenna and reflector array similar to Figure 6, but having a variable orientation;

Figure 9 is a perspective view of an antenna and reflector array in cooperation with a conducting sheet focusing reflector;

Figure 10:
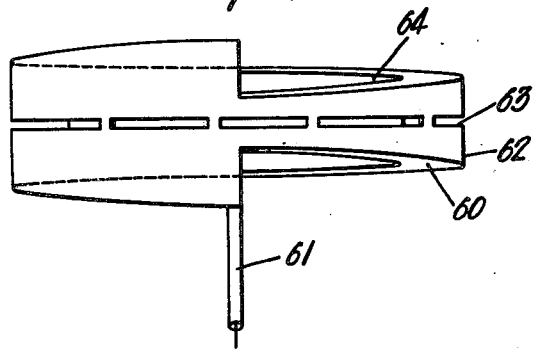
Figure 10 is a normal view of another antenna array adapted to radiate in different directions different frequencies within the resonant frequency limits of the antenna.

Referring more particularly to Fig. 1, there is provided a radio transmitter which may comprise an ultra-high frequency oscillator 20 supplied with controlling pulses from a pulse generator 21. The pulses effectively turn the transmitter on and off to effect transmission of successive waves, as is well understood in the art. The frequency of the ultra-high frequency oscillator 20 is progressively changed by a frequency modulator 22 which, in turn, is supplied with a modulating signal from a signal source 23. The frequency modulated energy is fed to a frequency-selective antenna array 24 which has been indicated by a plurality of antenna symbols arranged in different directions to convey the concept that the radiated energy is frequency selectively transmitted in different directions. The different antennas 24 are in effect successively connected to the frequency modulated output of the ultra-high frequency oscillator 20. The transmitter, which comprises the elements 20 to 24, generates successive signals each of a different frequency, which are transmitted in different directions.

A radio receiver is coupled through a protective device 25 to the antenna array 24, which may comprise a plurality of dipole antennas, each resonant to one of the different frequencies transmitted by the transmitter. The radio receiver is in effect switched from one antenna to another conjointly with each particular frequency at which a transmission occurs. The receiver comprises a T. R. (transmit-receive) automatic protective device 25, a frequency-modulated local oscillator 26, a first detector and intermediate frequency amplifier 27, a second detector 28, and a video amplifier 29. The frequency of the local oscillator 26 is modulated or varied by the frequency modulation signal generator 23 at the same rate and with the same deviation as the transmitter. Thus the receiver is in tune with the transmitter, and has its direction of greater sensitivity determined by the radiating elements selected by the transmitted frequency.

The output of the video amplifier 29 is connected to influence the electron stream of a cathode ray tube 30, having a cathode 31, a grid 32, a first anode 33, a second anode 34 and two pairs of deflecting plates 35 and 36. In order that the scanning of the cathode ray tube 30 may be in synchronism with the rate at which the frequency is varied and hence the rate in which the directional transmission scans the horizon, the frequency modulation signal generator 23 of the radio transmitter is connected to control a scanning circuit 37, and the pulse modulating generator 21 is connected to control the start of each individual sweep. Thus with the radio transmitter directing energy in a southerly direction, the receiver will be receiving energy from the same direction and the trace on the screen 38 of the cathode ray tube 30 will be also in the same direction and hence if reflected energy is received by the receiver, the position of the indication on the directional trace will give an indication as to the distance from the transmitter to the object which is reflecting the radiant energy.

While the principal elements of the system are shown in Fig. 1 in block form only, those skilled in the art will readily understand the detailed form which the elements may take. For example, the generator 23 may supply a sawtooth voltage to effect linear variation of the frequency of oscillator 20 and local oscillator 26, through the medium of suitable devices such as reactance control tubes. Alternatively, the generator 23 could supply a pulse signal for actuating sawtooth voltage generators associated with the controlled devices.

In high power ultra-high frequency transmitting systems, it has been customary to use transit-time oscillation generators, and such generators have commonly been provided with pulse modulations. However, the output frequencies of such devices have been maintained reasonably constant. In order to provide a wide range of frequencies for frequency selective transmission in different directions, the present invention proposes to use, in addition, a method of frequency modulation whereby the output frequency of a transit-time oscillator is cyclically varied between two limits.

While the transmitter in Figure 1 has been shown as having an ultra-high frequency oscillator and a frequency modulator, it is to be understood that these two devices may be combined in a single device which therefore would be an oscillator frequency modulator.

In Figure 2 there has been shown one arrangement whereby the desired oscillator frequency modulator arrangement might be effected to produce the ultra-high frequencies which are to be radiated in different directions. A magnetron 40 of the cylindrical type is employed. The magnetron 40 has a glass envelope 41, a cylindrical anode 42, which might form part of the envelope, and a coaxial cathode 43. For the generation of ultra-high frequency, instruments of this type are provided with a magnetic field which generally is constant. The magnetic field generally has such flux density that the electron path just grazes the anode. Accordingly, the magnetron 40 is provided with a permanent magnet 44 having adjacent to each pole one of the two coils 45 and 46. The coils 45 and 46 are connected to the modulation signal generator 23. The permanent magnet establishes the center frequency of the oscillation which is varied in accordance with the change in the magnetic field produced by the effect of the coils 45 and 46. In order to provide a cyclic variation of the frequency output of the magnetron 40 the coils 45 and 46 may be energized from the control signal source 23. The rate at which the trace on the cathode ray tube 30 rotates is synchronized with the control signal. The varying flux supplied by the coils 45 and 46 produces a proportional variation of the magnetic field. Since the variation of the magnetic field produces a variation in the oscillation frequency of the magnetron, there may also be a variation in the power output. In order to maintain substantially constant power output, the anode voltage of the magnetron may be compensated in accordance with the modulation signal by a circuit indicated by the rectangle 47.

The angular velocity of electrons leaving the filament or cathode 43 of the magnetron 40 increases gradually up to a limiting value $\omega m = 8.84 \times 10^6 B$ gauss. The frequency generated, therefore, is dependent upon the density of the magnetic field. The electrons rotate about the filament with the maximum angular velocity given by the above equation when the anode current is just reduced to zero. When the flux density is just above the cut-off value the electron makes a partial revolution about the filament in moving from the cathode to the vicinity of the plate and back thereby having an orbit which just grazes the anode. In order to provide for the proper operation of the magnetron 40, well-known circuits may be employed for controlling the operating temperature of the filament and for controlling the anode voltage. A resonant output circuit may be coupled to the magnetron, and may have its resonant point varied by means of a variable reactance device operated by the modulating frequency generator 23.

In order that the various frequencies produced by the transmitter of Figure 1 may be radiated in different directions in accordance with the different frequencies, the energy from the ultra-high frequency oscillator 20 is fed by conventional coaxial cable or other wave guiding means to an antenna array composed of a series of elements arranged to be resonant selectively to each of a series of frequencies within the range of frequencies to be transmitted. The antenna at any instant, therefore, comprises the antenna element which is resonant to the particular frequency then being generated by the transmitter. As the transmitter frequency changes, the elements within the antenna system resonant to the altered frequencies will produce a selective radiation of the energy at such frequencies. Since these radiating elements are located at different positions, the radiation takes place in different directions. Each antenna element will include a radiating means, together with adjacent reflectors, correctly positioned and phased to assure beam formation at the resonant frequency. The amount of frequency modulation, the number of radiating means, the distance of each to its reflector or reflectors, the phasing of the radiating means and/or reflectors, the diameter of the array, etc. will be in accordance with well-known laws of beam formation.

In accordance with the present invention, several arrangements to accomplish this result are illustrated in the drawing. Referring to Figures 3 to 7, one form of antenna array is illustrated comprising a plurality of dipole antennas and cooperating dipole reflectors. For the purposes of explanation of a suitable arrangement, it will be assumed that a plurality of dipoles has been provided which are arranged in a circle. A perspective view of such antennas is represented in Figure 3 where a plurality of dipole antennas varying in size from the largest dipole antenna 49 to the smallest dipole antenna 50 are arranged in a circle. In this illustration the dot and dash lines are intended merely to outline more clearly the complete structure. The various dipole antennas between the two dipole antennas 49 and 50 consecutively vary in size, and the spacing between antennas is dependent upon the frequencies of wave lengths at which the dipoles resonate. In order that the radiation from the arrangement of the dipole antennas shown in Figure 3 may be outwardly in different directions dependent upon the frequency being generated, there is provided a reflector arrangement shown in Figure 4 composed of an equal number of dipole antennas varying in size from the largest dipole antenna 51 to the smallest dipole antenna 52. The distances between reflector dipole antennas and the radiating dipole antennas is also dependent upon the resonant frequency at which the dipole antennas respond. Therefore, it is apparent that the spacing between adjacent dipole antennas in each antenna array, the distances between corresponding radiator and reflector dipoles, and also the length of the dipole antennas are all determined by the resonant frequencies thereof. It will be recognized that these factors determine beam formation; consequently the laws of beam formation are a determining factor in the design of the array. The relation between the lengths of the dipoles and the spacings in respect to each other is graphically portrayed by Figure 7.

Since the radiated energy from each radiating dipole antenna with its reflector is preferably arranged to be in the form of a beam extending from the center of and perpendicular to the dipole antennas in a radially outward direction from the axis of the antenna array of Figure 6, means may be provided for varying the angular positions of the dipoles with respect to the axis of the antenna array for the purpose of varying the angle of radiation with respect to this axis. To illustrate this, Figure 8 has been drawn to show the dipole antennas at some arbitrary angular position with respect to the axis of the antenna array. It will then be evident that the radiating beam from the antenna array of Figure 8 will generate a conical shape figure as it sweeps around the array as compared to the circular single plane pattern generated by an antenna array with the dipoles arranged in accordance with Figure 6.

The directional properties and power gain of an antenna array similar to that of Figures 6 and 8 may, of course, be greatly enhanced by the addition of a conducting sheet focusing reflector. Such an arrangement is diagrammatically represented in Figure 9. Referring to Figure 9, the focusing reflector 53 is shown within the array of dipole antennas. When employing a focusing reflector with an antenna array similar to that of Figure 6, it will be realized by those familiar with the art that it is preferable to place the radiating dipoles within the reflecting dipoles in order to direct the greatest amount of the energy from the radiating antenna toward the focusing reflector. Thus Figure 9 shows the radiating dipoles 49 to 50 within the reflecting dipoles 51 to 52. Each of the radiating dipoles of the antenna arrays shown in Figures 6, 8 or 9 is connected to suitable means for distributing the generated energy to the antennas. The reflector dipole antennas may be arranged as parasitic reflectors or each of the reflector dipoles may be suitably energized with the correct phasing to produce a reflector array. It is also to be understood that more than the two rows of antennas may be used for further narrowing of the radiated beam, which procedure is well known in the art.

Figure 11:
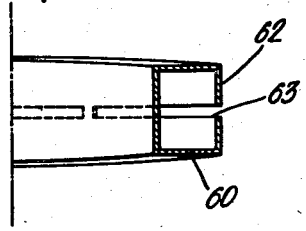
Figure 11 is a sectional view showing one-quarter of the antenna array shown in Figure 10 to illustrate its construction.

In place of an antenna array composed of a plurality of dipole antennas, a wave guide antenna might be provided as shown in Figures 10 and 11. Whereas the arrangement of dipole antennas consists of a plurality of resonant devices which are finite in number, the arrangement illustrated in Figures 10 and 11 approaches an infinite number of resonant elements between the limits of highest and lowest frequencies to be radiated. This apparatus, therefore, comprises a wave guide 60 which may be fed from a coaxial cable 61 connected to the transmitter apparatus. This guide 60, which also may be formed so that the outer edge 62 forms a section of a cylindrical surface, has intermediate the portions of the outer surface 62 a horizontal slot or opening 63. The hollow wave guide 60 as seen in Figure 11, therefore, may have a rectangular cross section which is interrupted by the slot 63. The slot is non-continuous to prevent the formation of non-radiating modes. Energy introduced into the wave guide 60 by a coaxial cable 61, or by wave guide, coupled thereto by suitable conventional means such as a loop, will travel along the wave guide toward the narrower portions thereof until the cut-off frequency of the wave guide has been reached for that particular energy. At the point in the wave guide where the cut-off frequency is reached the impedance of the guide for that particular frequency becomes very high, and if the propagation has been in the correct mode, radiation from the slot 63 will take place.

Figure 12:
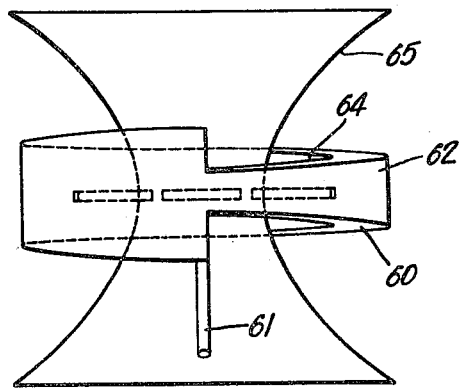
Figure 12 shows a modified array of Figure 10 in cooperation with a focusing reflector.
Figure 13:
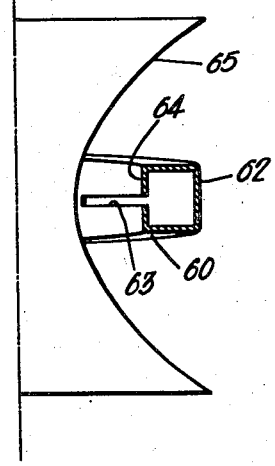
Figure 13 is a sectional view showing one-quarter of the antenna array shown in Figure 12 to illustrate its construction.

The directional properties and power gain of the wave guide antenna may also be improved by the addition of a suitable conducting sheet focusing reflector. In Figures 12 and 13 one arrangement of such an array is illustrated. Referring to Figure 12, there is shown a wave guide antenna similar to that of Figure 10 except that the slots or openings 63 are now located on the inner surface 64 of the wave guide 60, with a sheet focusing reflector 65 placed within the wave guide to reflect and direct the energy radiated from the opening 63 of the wave guide 60. Thus it is apparent that the antenna array formed of a slotted wave guide shown in either Figures 10 or 12 operates in a manner analogous to the dipole antenna array of Figures 3 to 6 to selectively direct radiant energy outwardly from the antenna array in a direction determined by the frequency being supplied thereto.

A wave guide similar to that shown in Figures 10 and 11 by having the slot 63 closed may be used as a means for distributing the energy to the various transmitting dipole antennas of the antenna array shown in Figure 3 or 6. The apparatus such as shown in Figure 10 would be placed within the antenna array of Figure 3 or within the inner antenna array which is the reflector in Figure 6. The transmitting antennas would be connected to the wave guide 60 by suitable coaxial structure coupled thereto by capacity hats. The high frequency resonant dipoles, of course, would be coupled into the narrowest portion of the wave guide and the lowest frequency resonant dipoles would be coupled to that portion of the wave guide having the largest cross sectional area and each dipole would be coupled to the wave guide at its cut-off point for that particular frequency.

With either the antenna array of Figure 3 or the antenna and reflector array of Figure 6 energized by a wave guide it is, of course, possible to increase the directional properties and the power gain of the system by means of the previously mentioned conducting sheet focusing reflectors. One such arrangement is illustrated in Figure 14 in which an array similar to that of Figure 9 is coupled in the manner described above to a wave guide of the form shown in Figure 10 except that the slots 63 are now closed.

Figure 14:
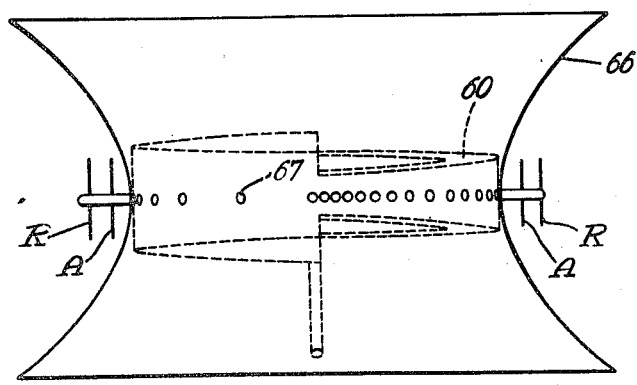
Figure 14 is a simplified elevation of an antenna system combining modified arrays of those shown in Figures 9 and 10.

Referring to Figure 14, the wave guide 60 is shown by the dashed lines within the focusing reflector 66. For clarity but two pairs of antennas A and R are shown, it being understood that similar dipoles of the correct length and spacing for the frequency involved extend outward from the circular openings 67 in the focusing reflector and wave guide. The radiating antennas indicated at A may be coupled to the wave guide 60 in a manner described above, while the reflecting antennas R may be either parasitic dipoles or dipoles fed in the correct phase to produce reflecting antennas.

It is obvious that other configurations and combinations of the dipole antennas, wave guides and focusing reflectors than those illustrated may be employed to obtain the desired beam formations. Also other methods might be used to couple the radiating dipole antennas to the transmitter and other methods may be employed to obtain frequency selective radiators which operate in a manner similar to the antenna arrays shown and described.

The invention consists essentially of a system for transmitting pulsed, frequency-modulated radio energy in a series of automatically and electrically varied directions, receiving directional reflections of such transmitted energy, and energizing an indicating means by such reflections for the determination of the position in azimuth and distance of the subject or objects causing the reflections.

It is, therefore, obvious that other means for producing and receiving frequency modulated ultra-high frequency signals, as well as other indicating means than that described and illustrated in the drawings, will occur to those skilled in the art. The invention is, therefore, not to be regarded as having any restrictions with respect to the apparatus and means which may be employed to obtain the desired results other than those imposed by the following claims which serve to define the scope of the invention.

I claim:

1. In a system of the class described, means for generating high frequency oscillations, means for cyclically varying the frequency of said oscillations, thereby to produce successive signals of different frequencies, an antenna array connected to said signal-generating means, said array including a plurality of circularly-arranged dipole antennas of different sizes to transmit the different signals in different directions, a receiver arranged to receive reflections of said signals, means for cyclically rendering said receiver receptive to the frequencies of said signals, and means connected to said receiver for indicating the direction from which a reflected signal is received.

2. In a system of the class described, means for generating high frequency oscillations, means for cyclically varying the frequency of said oscillations, thereby to produce successive signals of different frequencies, an antenna array connected to said signal-generating means, said array including a plurality of circularly-arranged dipole antennas of different sizes to transmit the different signals in different directions, a plurality of corresponding dipole reflectors cooperatively associated with the respective antennas, a receiver arranged to receive reflections of said signals, means for cyclically rendering said receiver receptive to the frequencies of said signals, and means connected to said receiver for indicating the direction from which a reflected signal is received.

WILLIAM A. STEWART.

(References on following page)

REFERENCES CITED

The following references are of record in the file of this patent:

UNITED STATES PATENTS

| Number | Name | Date |
|---|---|---|
| 1,424,365 | Loftin et al. | Aug. 1, 1922 |
| 1,988,020 | Rieber | Jan. 15, 1935 |
| 2,045,071 | Espenschied | June 23, 1936 |
| 2,139,460 | Potapenko | Dec. 6, 1938 |
| 2,189,549 | Hershberger | Feb. 6, 1940 |
| 2,210,651 | Busignies | Aug. 6, 1940 |
| 2,236,893 | Chaffee | Apr. 1, 1941 |
| 2,257,320 | Williams | Sept. 30, 1941 |
| 2,277,464 | Taylor | Mar. 24, 1942 |
| 2,318,170 | Linder | May 4, 1943 |
| 2,326,314 | Usselman | Aug. 10, 1943 |
| 2,377,902 | Relson | June 12, 1945 |
| 2,399,426 | Bradley | Apr. 30, 1946 |
| 2,403,622 | Tuska | July 9, 1946 |
| 2,406,953 | Lewis | Sept. 3, 1946 |
| 2,407,169 | Loughren | Sept. 3, 1946 |
| 2,412,702 | Wolff | Dec. 17, 1946 |
| 2,418,156 | Bollmann | Apr. 1, 1947 |
| 2,433,804 | Wolff | Dec. 30, 1947 |